United States Patent [19]

Miller

[11] 3,944,259

[45] Mar. 16, 1976

[54] TRAILER JACKING DEVICE

[76] Inventor: Daniel C. Miller, Rte. 2, Box 355, Oakley, Calif. 94561

[22] Filed: Jan. 20, 1975

[21] Appl. No.: 542,648

Related U.S. Application Data

[63] Continuation-in-part of Ser. No. 429,222, Dec. 28, 1973, abandoned.

[52] U.S. Cl. ............. 280/475; 280/150.5; 280/477
[51] Int. Cl.² ........................................... B60D 1/14
[58] Field of Search.................. 280/475, 477, 150.5

[56] References Cited
UNITED STATES PATENTS

| 950,545 | 3/1910 | Taubert ........................ 280/150.5 X |
| 2,595,453 | 5/1952 | Gilmore ........................... 280/150.5 |
| 2,865,658 | 12/1958 | Dubuque ........................... 280/475 |
| 3,146,002 | 8/1964 | Faber............................. 280/475 X |
| 3,315,973 | 4/1967 | Marple........................ 280/150.5 X |
| 3,791,676 | 2/1974 | Spratlen............................. 280/475 |

Primary Examiner—Robert R. Song
Assistant Examiner—John A. Pekar
Attorney, Agent, or Firm—Townsend and Townsend

[57] ABSTRACT

An improved trailer jacking device and method. The device comprises a trailer tongue frame, an adjustable pivotal strut mounted medially of said frame, and caster and wheel provided with a lock at the lower end of the strut. To connect a vehicle to a trailer equipped with such device, the strut stands in a position back past vertical, holding the tongue and female hitch member at a predetermined height, and the vehicle above the elevation of the hitch ball is backed toward the trailer tongue. As the vehicle pushes the trailer tongue backward, the strut will pivot forward, lowering the female member on the ball hitch and removing the weight of the trailer tongue from the strut. The strut is then moved upward to stowage position, or removed for stowage in the vehicle. To unhitch a trailer from a hitch ball, the strut is placed so that its wheel rests upon the ground in a forward position, the wheel is locked, and as the vehicle is driven forward the strut pivots backward to a position past vertical, raising the trailer tongue and female hitch member above and off of the ball hitch, thus disengaging the trailer from the vehicle.

20 Claims, 8 Drawing Figures

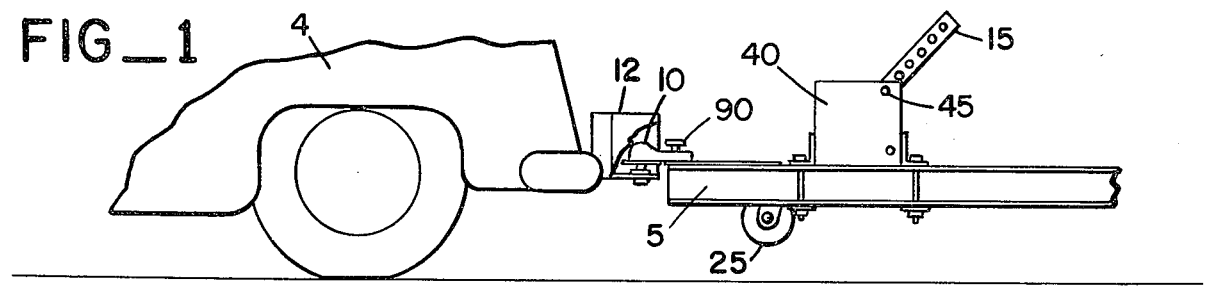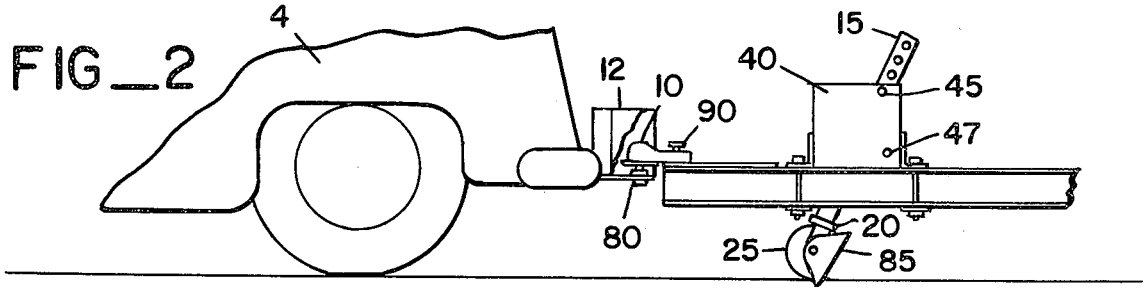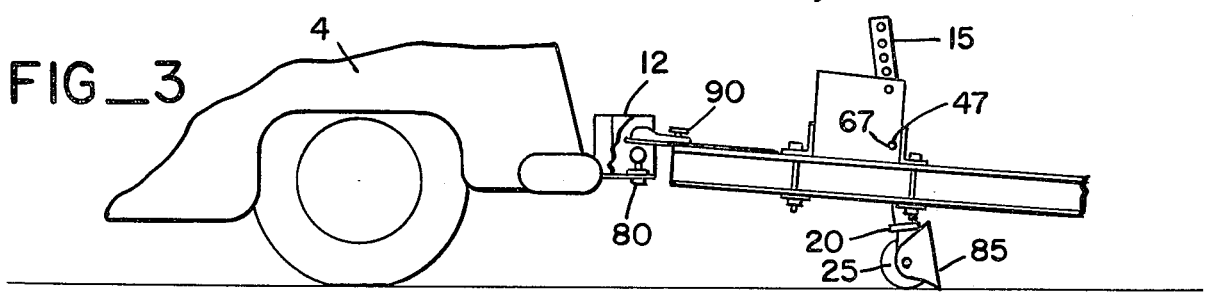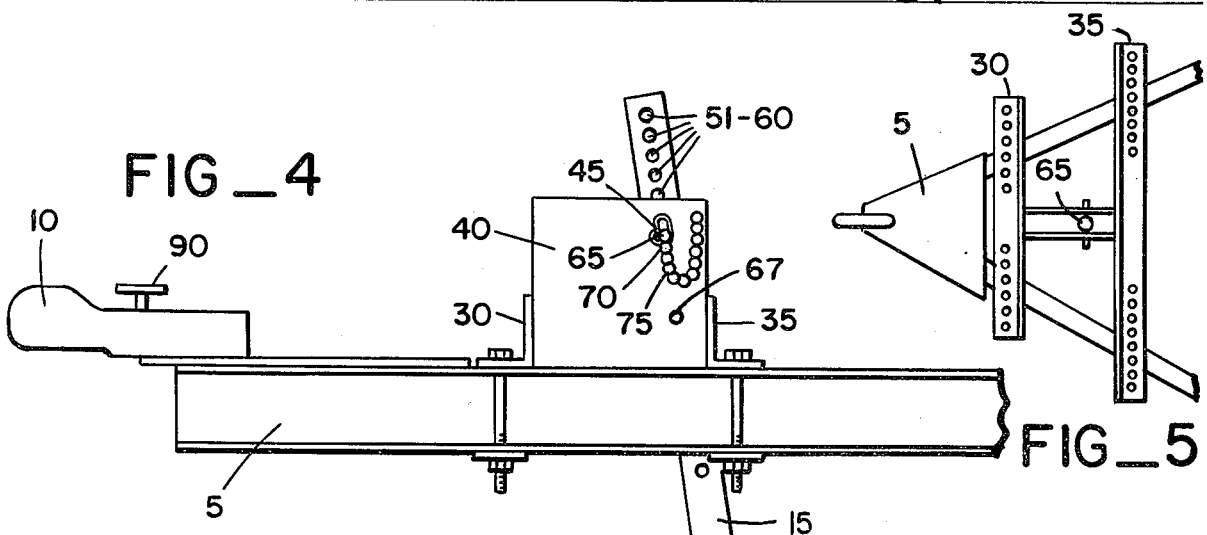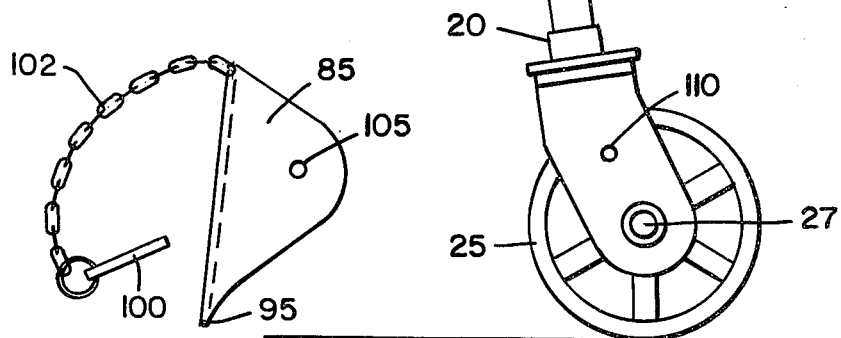

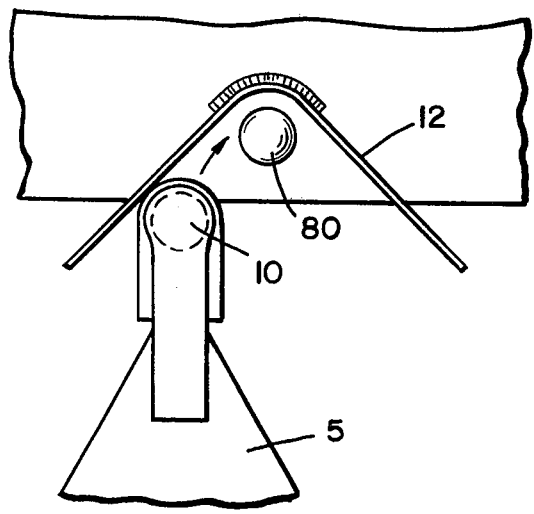
FIG_6
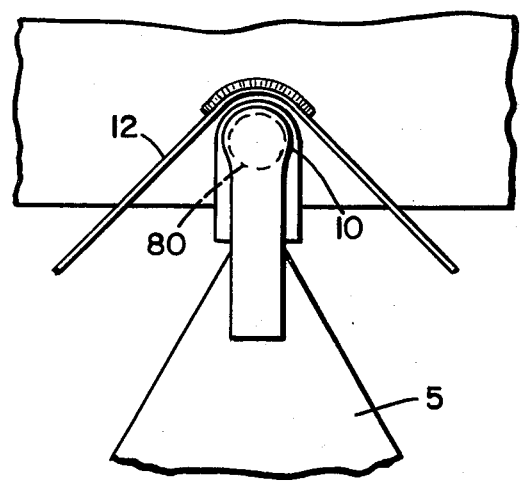
FIG_7
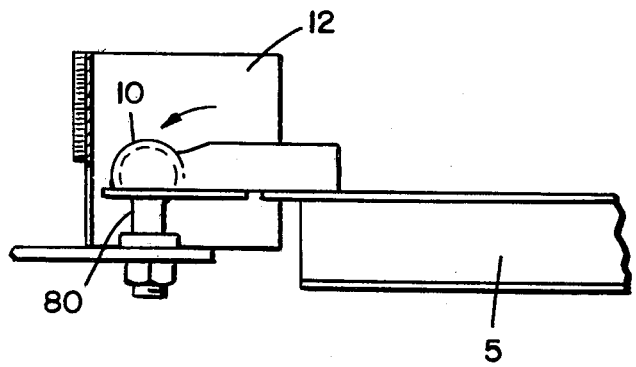
FIG_8

TRAILER JACKING DEVICE

This application is a continuation-in-part of my copending application for TRAILER JACKING DEVICE, Ser. No. 429,222 filed Dec. 28, 1973, now abandoned.

GENERAL DESCRIPTION

The preferred embodiment of the invention shown in the drawings and described hereinafter comprises a trailer tongue mounted upon a trailer, including an adjustable pivotal strut and caster mounted medially of said tongue frame, so that the female hitch member on the trailer overlies the male member attached to a vehicle; and a means for locking the strut in raised position for movement of the trailer while not attached to a vehicle.

It has been the custom and practice in the trailer jacking art to provide trailer tongue frames with a manually operated jack, or a cable and winch which elevates the tongue frame to a level so that the female member of a ball hitch may be raised over the male member, or the tongue frame lowered so that both hitch members engage.

However, the use of a manual jack requires the steps of activating said manual jack so that the trailer tongue frame is sufficiently elevated to receive the male member, and then driving the towing vehicle so that the female member overlies the male member. This is not only time-consuming, but produces much frustration, because if the members are not in precise alignment, the jacking frame cannot be lowered thereupon.

Moreover, in cases where a winch and cable are employed to raise the tongue frame over the ball hitch, often times the frame cannot be raised high enough to overlie the ball hitch, if the vehicle or material being towed is too heavy to allow the tongue frame to be manually cranked. Further, such a winch and cable arrangement may prove dangerous to the user, insofar as the brake on the winch may fail and the winch handle fly back and injure the user, who must be in proximity to operate such handle.

Further, there is always the danger, with both conventional trailer tongues and those provided with a winch, that the tongue or trailer may fall upon the user as he attempts to elevate the same over the ball hitch.

Hence, it is an object of the invention to provide an improved trailer jacking device which employs a pivotal strut which raises the tongue frame above the ball hitch by the simple expedient of driving the towing vehicle forward.

It is an additional object of this invention to provide an improved trailer jacking device which allows easy connection with a towing vehicle by providing a tongue frame with a pivotal strut which pivots forward as the towing vehicle is driven backwards in such a fashion that the female hitch member descends to rest securely on its male counterpart.

Yet another advantage of the present invention is to provide a trailer jacking device which raises and lowers a tongue frame without the necessity of the user jacking the frame manually or cranking a winch and cable arrangement.

It is a further object of this invention to provide an improved jacking system which obviates the presence of the user in proximity to the trailer when it is being raised, thus enhancing his safety.

The present invention is intended primarily for use with recreational vehicles such as boat and house trailers, and other recreational vehicles.

IN THE DRAWINGS

The objects, features, and advantages of the present invention will be more apparent after referring to the following specifications and drawings, in which:

FIG. 1 is a side elevation of a towing vehicle, ball hitch, and trailer tongue frame with adjustable pivotal strut stowed out of the way after the female hitch member has come to rest on its male counterpart carried by the towing vehicle.

FIG. 2 is a side elevation showing the adjustable strut and caster dropped from its stowed position onto the ground before unhitching, and after installation of the shoe which locks the wheel so that it cannot rotate.

FIG. 3 is a side elevation which shows the towing vehicle moving foward, thus pivoting the strut and caster backwards, and raising the female hitch member, thus disengaging the trailer.

FIG. 4 is a side elevation showing trailer tongue frame, adjustable pivotal strut, caster, brakes, and the like in a close-up view.

FIG. 5 is a plan view of the trailer tongue frame looking down upon the pivotal strut and showing its medial position with respect thereto.

FIG. 6 is a plan view of the trailer tongue frame engaging the hitch guide as the vehicle is moved backwardly toward the trailer to engage the same.

FIG. 7 is a plan view illustrating engagement of the trailer tongue frame with the ball hitch.

FIG. 8 is a side elevation and partial section view showing the trailer tongue frame engaged with the ball hitch.

The invention herein described generally includes a trailer tongue frame 5, a female hitch member 10 provided at the apex of said frame, a strut 15 mounted medially of said frame, a caster 20 provided at one end of said strut, and a wheel 25 mounted on said caster. A shoe 85 having a depending pointed position 95 is attachable to caster 20.

Referring particularly to FIG. 5, it will be seen that trailer tongue frame 5 is cross-braced by members 30 and 35. Between said members, at right angles, is constructed housing 40 composed of facing parallel walls of heavy steel. Housing 40 is further provided with hole 45.

Referring to FIG. 4, it will be seen that a strut 15 is provided with apertures 51 through 60, drilled to substantially the same diameter as hole 45. Shaft 65 may be placed in hole 45, and through any one of the several apertures 51 through 60 provided in strut 15, thereby pivotally mounting said strut within housing 40.

Referring more particularly to FIG. 4, it will be seen that caster 20 is provided at one end of strut 15. Caster 20 is further provided with wheel 25 joined to said caster by shaft 27. Wheel 25 is rotatable with respect to caster 20, and caster 20 is so designed that it may swivel about strut 15. Wheel 25 is firmly locked in rigid position when shoe 85 is attached thereto by insertion of pin 100 at the end of chain 102 through corresponding apertures 105, 110 in the shoe and caster respectively. When shoe 85 is so installed, pin 100 passes between the spokes of the wheel to prevent rotation of the wheel.

Now that various elements of the structure have been generally set forth, its operation will be perceived. The height of trailer tongue frame 5 after strut 15 has been pivoted to vertical position will depend which aperture 51 through 60 has been selected. It will be understood that frame 5 must be initially raised by means of a manual jack or other implement to select the aperture 51 through 60 along the shaft of strut 15 requisite to raise jacking frame 5 a preselected distance above hitch member 80 when strut 15 has been fixed in vertical position past its pivot point.

Referring to FIG. 3, it will be seen that as a towing vehicle 4 backs toward jacking frame 5, male hitch member 80 will underlie female hitch member 10. It will be understood there are different ways by which bolt 90 may be activated to secure the hitch. Once towing vehicle 4 gives a movement to jacking frame 5, strut 15 will pivot.

It will be observed that the path of travel of strut 15 with respect to frame 5 is impeded approximately 15 degrees past its vertical pivot point position by means of cross-brace 35. It will be further observed that after the appropriate height of frame 5 has been selected, pin 67 may be placed in hole 47 provided in housing 40 beneath hole 45. Thus, after strut 15 has been positioned between both walls of housing 40 so that frame 5 is raised to the desired height, strut 15 can be prevented from pivoting forward by means of insertion of pin 67 in hole 47 and through one of the remaining vacant apertures 51 through 60 provided in strut 15. The end of shaft 65 may be provided with handle 70 and chain 75 to aid in shaft 65's easy insertion and withdrawal from hole 45.

When towing vehicle 4 is backed up, the V-shaped hitch guide 12 attached to vehicle 4 and partially surrounding male hitch member 80 will contact female hitch member 10 and center it, as illustrated in FIG. 6 and 7. When the member 10 is centered, strut 15 will pivot forward, lowering female hitch member 10 upon male hitch member 80, as shown in FIG. 8. Since the hitch members will be in axial alignment, and since now female hitch member 10 overlies male hitch member 80, bolt 90 may be activated to secure the hitch. It will be noted that, before towing vehicle 4 is driven backwards, shoe 85 is attached to caster 20 so that wheel 25 cannot rotate. Also, the depending pointed portion 95 of shoe 85 digs into the ground when strut 15 is at an angle so that the locked wheel cannot slide along the ground. It will be observed that, once strut 15 has swung forward, it may be pivoted upward into stowage position as seen in FIG. 1.

To effect separation of hitch members, bolt 90 is deactivated, shoe 85 is attached and strut 15 lowered so that the pointed portion 95 of shoe 85 rests upon the ground. Towing vehicle 4 is simply driven forward and, as it is so driven, strut 15 will pivot backward, raising female hitch member 10 of frame 5 above male hitch member 80 of towing vehicle 4. As noted, the backward pivotal movement of strut 15 will be impeded by cross-brace 35 at which time pin 67 may be inserted to rigidly hold strut 15. In this configuration shoe 85 can be detached for movement of the trailer independent of vehicle 4 using wheel 25 which is free to rotate.

It will be observed that when frame 5 is motivated to and fro by towing vehicle 4, the path of frame 5 will describe a segment of an arc with respect to vehicle 4, said arc having its center where strut 15 meets the ground.

While one embodiment of the invention has been shown and described, it will be obvious that other adaptations and modifications can be made within the true spirit and scope of the invention.

What is claimed is:

1. An improved trailer jacking device comprising, in combination, a trailer tongue frame mounted at one end of a trailer, an elongated, rigid strut one end of which is pivotally mounted medially of said frame and having a wheel at its other end free to rest upon the ground, said wheel being lockable with respect to said strut, and means for rigidly holding said strut in substantially vertical position with respect to said frame, so that when said wheel is placed upon the ground and locked and said strut pivoted into substantially vertical position with respect thereto, said frame will rise a preselected distance above the ground.

2. The invention of claim 1 wherein said frame includes a pair of cross-braces and a rigid housing mounted thereon, pivotally carrying said strut.

3. The invention of claim 1, wherein said elongated strut is provided with a series of apertures for adjusting said strut with respect to said frame so that when said strut is in vertical position, said frame may be raised or lowered with respect to the ground.

4. The invention of claim 1, wherein said support means includes a caster mounting the wheel to the strut.

5. The invention of claim 1, including a shoe attachable to the other end of the strut, said shoe including a pointed portion at the lower end thereof adapted to contact the ground during pivoting of said strut to prevent sliding of the wheel over the ground.

6. The invention of claim 1, wherein said means for rigidly holding said strut in substantially vertical position includes at least one brace mounted horizontally across the path of travel of said strut.

7. In combination with a trailer, an improved trailer jacking device comprising a trailer tongue frame mounted at one end of said trailer and having a female hitch member provided at one end thereof, a rigid elongated adjustable strut having a wheel which may be locked in rigid position with respect to said strut at one end disposed on the ground and the other end of said strut mounted medially of said frame so that said strut may pivot along a path substantially parallel to the longitudinal axis of said trailer, and means for holding said strut in substantially vertical position with respect to said frame so that when said strut is pivoted into vertical position, said female hitch member will be raised a preselected distance above a complementary male hitch member annexed to a towing vehicle.

8. The invention of claim 7, wherein said frame includes a pair of adjustable cross-braces, a rigid housing mounted on such braces having a pair of opposing sidewalls, and a shaft journaled through such walls, so that one end of said strut may be pivotally mounted on said shaft within such walls.

9. The invention of claim 8, wherein one end of said strut is provided with a plurality of apertures which may alternately receive said shaft, so that when said strut is pivoted into vertical position and said support means rests upon the ground, the height of said frame may be adjusted with respect to such ground.

10. The invention of claim 7, including a shoe attachable to said one end of the strut, said shoe including a depending pointed portion adapted to contact the ground during pivoting of said strut to prevent sliding of the wheel relative to the ground.

11. The invention of claim 10, in which said wheel includes a caster mounted above said wheel.

12. The invention of claim 7, in which said holding means is a cross-brace mounted horizontally across to said frame and across the path of travel of said strut.

13. A method of adjusting the height of a trailer with respect to a towing vehicle, comprising the steps of providing a towing vehicle with a first hitch member and the trailer with a trailer tongue frame having a second hitch member and additionally having a strut, one end of which is pivotally mounted medially of said frame and the other end of which includes a wheel lockable with respect to the strut and which is disposed on the ground to generally allow movement of the trailer over the ground, locking the wheel to prevent such movement, and driving said towing vehicle against or pulling said frame to pivot said strut into a substantially vertical or collapsed position, thereby raising or lowering said second hitch member with respect to said first hitch member.

14. A method as recited in claim 13 wherein said providing step includes the step of providing the towing vehicle with a hitch guide partially surrounding the first hitch member, and wherein said driving step includes the step of driving the hitch guide on the towing vehicle against the frame to pivot said strut into a substantially collapsed position to lower the second hitch member with respect to the first hitch member.

15. A method for coupling and uncoupling a trailer having a first hitch member from a towing vehicle having a complementary second hitch member and including a strut pivotable with respect to the trailer in a plane parallel to the horizontal direction and provided with a lockable wheel at one end thereof, the method comprising the steps of locking the wheel, moving the vehicle in a first, generally horizontal direction, imparting the vehicle movement to the trailer to move the trailer in the same horizontal direction, and engaging the wheel at said one end of the strut with the ground while moving the trailer in the horizontal direction to thereby pivot the strut and raise or lower the first member.

16. A method according to claim 15 wherein the step of moving the vehicle in a horizontal direction comprises the steps of initially moving the vehicle towards the trailer, thereafter engaging a portion of the vehicle with a portion of the trailer, moving the trailer laterally with respect to the direction of movement of the vehicle to center the hitch members, and only thereafter moving the vehicle and the trailer together in the horizontal direction.

17. A method according to claim 16 wherein the towing vehicle has a hitch guide partially surrounding the second hitch member, and wherein said engaging a portion of the vehicle with a portion of the trailer comprises engaging the hitch guide with the first hitch member.

18. A method for coupling and uncoupling a trailer to a towing vehicle, the towing vehicle having a first hitch member adjacent to aft end, the trailer having a complementary second hitch member at its forward end mounted to a trailer tongue frame disposed above ground, and a strut pivotal in a plane parallel to the longitudinal axis of the trailer, a lower end of the strut including a wheel engaging the ground to allow for movement of the trailer over the ground and maintaining the frame sufficiently spaced from the ground so that the second hitch member is above the first hitch member, the method comprising the steps of driving the vehicle towards the trailer in an aft direction, centering the coupling members with respect to each other, locking the wheel to prevent rotation thereof, thereafter moving the trailer with the vehicle in the aft direction to lower the frame and engage the hitch members, raising the wheel at the strut end above ground, and thereafter separating the coupled vehicle and trailer by lowering the wheel at the strut end and engaging it with the ground while the trailer remains coupled to the vehicle, and driving the vehicle in a forward direction away from the trailer to thereby pivot the strut, raise the frame with respect to the ground, and release the hitch members.

19. A method according to claim 18, including the step of locking the strut against relative pivotal movements in the position in which the coupling members are disengaged.

20. In combination with a trailer, an improved trailer jacking device comprising a trailer tongue frame mounted at one end of said trailer and having a female hitch member provided at one end thereof, a rigid housing mounted on said frame having a pair of opposing sidewalls, a rigid elongated adjustable strut having one end disposed on the ground and its other end mounted medially of said frame so that said strut may pivot along a path substantially parallel to the longitudinal axis of said trailer, a shaft journaled through the sidewalls so that one end of said strut may be pivotally mounted on said shaft within such walls, one end of said strut being provided with a plurality of apertures which may alternately receive said shaft so that the height of said frame may be adjusted with respect to such ground, and means for holding said strut in substantially vertical position with respect to said frame so that when said strut is pivoted into vertical position, said female hitch member will be raised a preselected distance above a complemntary male hitch member annexed to a towing vehicle.

* * * * *